Dec. 28, 1965 W. S. FUJITSUBO 3,226,697
INFORMATION STORAGE SYSTEM USING COLOR CODE
Filed Nov. 27, 1963
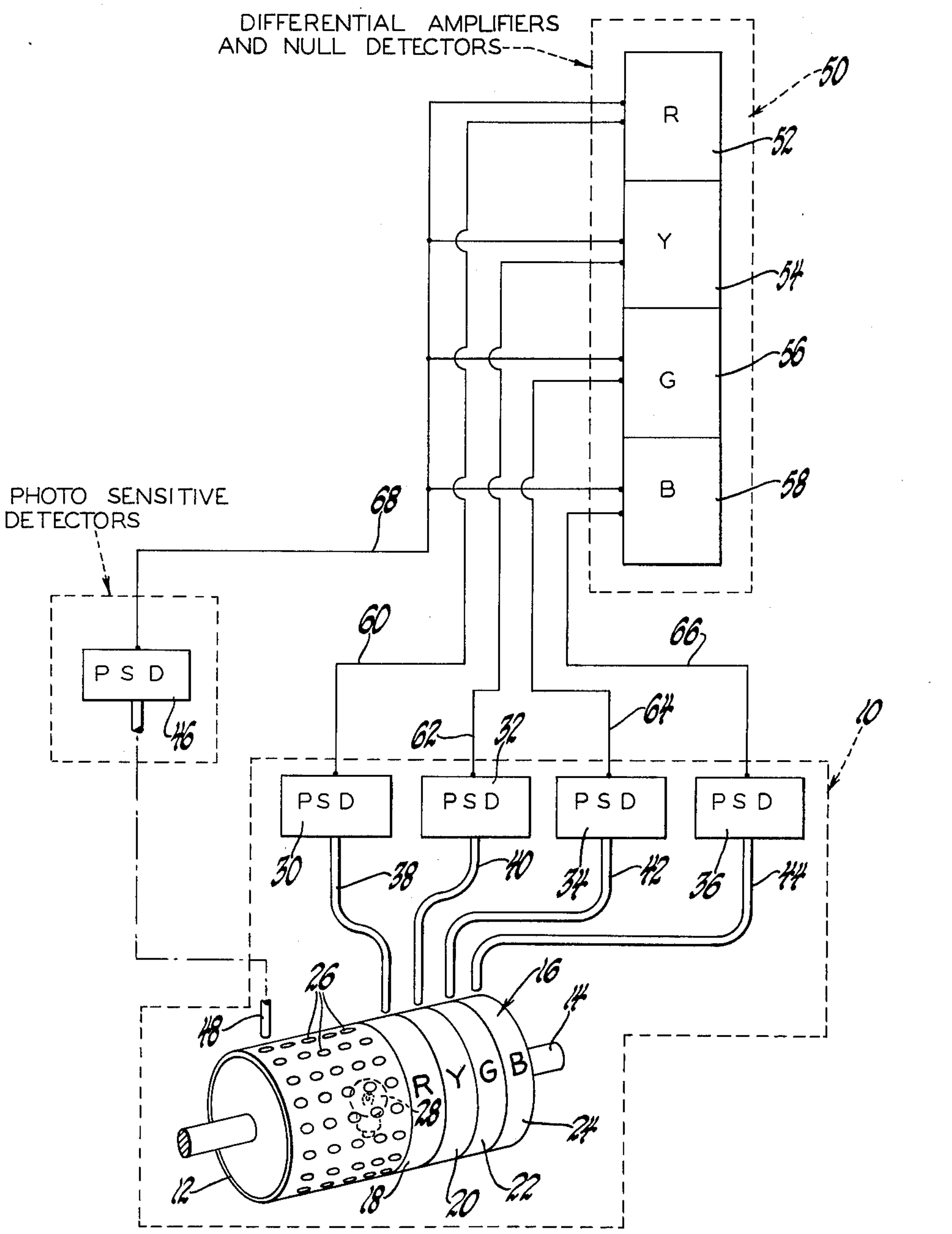
INVENTOR.
William S. Fujitsubo
BY
Hugh L. Fisher
ATTORNEY 3,226,697
Patented Dec. 28, 1965

3,226,697

INFORMATION STORAGE SYSTEM USING COLOR CODE

William S. Fujitsubo, Reseda, Calif., assignor to General Motors Corporation, Detroit, Mich., a corporation of Delaware Filed Nov. 27, 1963, Ser. No. 326,551
3 Claims. (Cl. 340—173)

This invention relates to information storage systems and, more particularly, to such systems in which information is stored by means of a color code.

With the increasing importance of information storage systems for use in computers, various storage techniques have evolved. The most common information storage systems comprise storage elements capable of assuming two stable states representative of different information values. Typical elements are magnetic cores, flip-flops, and black and white photographic prints. Many other two state devices are also possible. But characteristically, only two information values may be stored at any particular location.

In accordance with the present invention, an information storage system is presented in which one of a plurality of information storage values may be stored at any storage location. In general, this is accomplished through the use of a photographically developed storage surface in which a storage area may be developed in one of a plurality of colors. To very accurately determine the color of the storage area and, therefore, the information content thereof, means are provided to compare the color of the storage elements with the colors of a plurality of reference areas on the photographically developed surface. A match between the color of the storage area and a reference area indicates the color of the storage area and, therefore, the informational content thereof.

According to the invention, a rotary type memory is provided to store information which may be read out in a non-destructive fashion. A particular feature of this invention is the fact that it admits of a simultaneous development of the reference and storage areas. By this technique, any differences in shade which are introduced into the storage areas due to variations in the development process will also be introduced into the reference areas, and a perfect color match will not be prevented due to the development variations.

Another feature of the invention is that no color filters are required to interpret the information values at the storage areas. These and other features and advantages of the present invention will be made more apparent upon reading of the following detailed description of a particular embodiment which is shown in the accompanying drawing.

In the drawing a rotary storage and retrieval system is generally indicated at 10. The storage and retrieval system includes a drum member 12 which is mounted for rotation on an axle 14. Fastened to the surface of the drum 12 is a photographically developed print 16. Developed on the print 16 are a plurality of color reference channels 18, 20, 22 and 24 corresponding with the colors red, yellow, green and blue, respectively. Each of the channels 18, 20, 22 and 24 is circular in nature and represents according to color a distinct information value. Toward the left side of the drum 12 as shown in the drawing, there are photographically developed a large number of storage areas 26 which may be of a color corresponding with any one of the reference channels 18, 20, 22 and 24. It is to be understood that the information storage and reference areas are greatly out of scale for the sake of clarity. Disposed within the drum 12 is a light source 28 which is effective to direct light through all of the storage areas 26 as well as through the reference channels 18, 20, 22 and 24.

For the purpose of producing signals related to the colors of each of the reference channels 18, 20, 22 and 24, a plurality of photosensitive detectors 30, 32, 34 and 36 are provided. To link the reference channels 18, 20, 22 and 24 with the photosensitive detectors 30, 32, 34 and 36, respectively, a plurality of light pickups 38, 40, 42 and 44 in the form of optical fiber bundles are provided. As can be seen, the light pickup 38 is located with one end adjacent the red reference channel 18, and the other end terminating within the photosensitive detector 30. Although not shown in detail in the drawing, it is to be understood that the photosensitive detectors may comprise, for example, semiconductor diodes or transistors. As is well known, such semiconductor devices are light sensitive and, in fact, are responsive to the wave lengths of incident light at a junction thereof to produce a distinct ampere output. Therefore, it is to be understood that each of the light transmission pickups 38, 40, 42 and 44 directs light upon the semiconductor junction of each of the photosensitive detectors 30, 32, 34 and 36, with the result being that the current output of each of the detectors is of an amplitude which is distinct to the colors of the associated reference channels.

To produce signals corresponding with the particular colors of the storage areas 26, a scanning photosensitive detector 46 is provided. The photosensitive detector 46 has associated therewith an optical fiber bundle light pickup 48, the input end of which is displaceable over the surface of the drum 12 to pick up signals corresponding with the color of the particular reference area 26 which is adjacent the pickup 48. It can be seen that as the drum 12 rotates such that respective storage areas 26 are scanned by the pickup 48, the output of the photosensitive detector 46 will consist of a plurality of distinct signals which vary in amplitude according to the color of the spot being scanned.

To interpret the information content of the storage areas 26, the output signal of the photosensitive detector 46 is compared simultaneously with the output signals of each of photosensitive detectors 30, 32, 34 and 36. This is accomplished by means of a comparison means shown in block diagram at 50. The comparison means more particularly comprises a plurality of differential amplifiers and null detectors 52, 54, 56 and 58. The differential amplifiers and null detectors are labelled, in addition, with the letters R, Y, G and B, corresponding with the reference colors of the channels 18, 20, 22 and 24, respectively. Accordingly, the outputs of each of the reference detectors 30, 32, 34 and 36 are connected to a first input of each of the differential amplifiers and null detectors 52, 54, 56 and 58. More specifically, the output signal of photosensitive detector 30 is transmitted by means of conductor 60 to a first input of the red differential amplifier and detector 52. Similarly, the output signal of detector 32 is transmitted by means of conductor 62 to the first input of the yellow amplifier and detector 54. In a like fashion, conductors 64 and 66 convey the output signals of detectors 34 and 36 to the amplifiers 56 and 58, respectively. The second input for comparison purposes to all of the amplifier and null detectors 52, 54, 56 and 58 is received from the output of the photosensitive detector 46 by means of conductor 68.

The differential amplifiers and null detectors 52, 54, 56 and 58 are responsive to the simultaneous occurrence of two signal inputs to produce an output signal only when the amplitudes of the two input signals are equal. Thus, if, for example, the color of the particular storage area 26 being scanned by pickup 48 is red, detector 46 produces an output signal of an amplitude which corresponds with a red input signal. Therefore, only the red detector 52 receives two signals of corresponding amplitudes. The output of the detector 46 does not correspond with the input to any of the amplifier and detector combinations 54, 56 or 58. Therefore, detector 52 is the only one to produce an output signal. This may indicate to a computer or other information utilization means that the color storage area 26 being scanned is red. It may be seen from the figure that as the pickup 48 is moved from spot to spot by means of a lateral displacement thereof and a rotary displacement of the drum 12, an appropriate output signal will be provided by whichever one of the differential amplifier null detectors corresponds to the color of the storage area 26 being scanned.

The invention is particularly adaptable to rotary type memories such as drums or discs. However, it is to be understood that the invention is not necessarily limited thereto. It can be seen from the foregoing description that the information stored in the memory system is not destroyed by the reading operation. It may be particularly advantageous to employ a memory section which provides nondestructive readout in combination with a memory section in which information is destroyed by readout such that the nondestroyable portion may carry specific instructions while new material may be written into the destroyable section. Further additions and modifications to the invention as described above will no doubt be apparent to those skilled in the art, and the specific embodiment described herein is therefore not to be taken in a limiting sense. For a definition of the invention, reference should be had to the appended claims.

What is claimed is:

1. In information storage means, a photographically developed print having therein a plurality of reference areas of respective colors and at least one discrete storage area of a color to be determined, means for determining the color of the storage area comprising a first photosensitive means operatively associated with the storage area for producing a first electrical signal output related to the color thereof, a plurality of second photosensitive means operatively associated with the reference areas for producing respective second output signals related to the colors of the reference areas, a plurality of comparison means having two inputs and an output, means connecting the outputs of the second photosensitive means to one of the inputs of the respective comparison means and means connecting the output of the first photosensitive means to all of the other inputs of the comparison means for simultaneously comparing the first output signal with each of the second output signals.

2. Information storage means including a photographically developed print having therein a plurality of reference areas of respective colors and a plurality of storage areas, each of the storage areas being of a color which corresponds with one of the reference areas, means to direct light through the print, first photosensitive means for scanning the storage areas and for producing electrical signals related to the respective colors thereof, second photosensitive means operatively associated with the reference areas for producing respective electrical signals related to the colors thereof and comparison means for simultaneously comparing the output of the first photosensitive means with the outputs of each of the second photosensitive means and to produce respective output signals corresponding to the differences between the compared signals.

3. A rotary storage system for color coded information including a rotatably mounted storage surface having a plurality of photographically developed reference channels of different colors representing different information values and a plurality of photographically developed storage areas, the colors of the storage areas corresponding to one of the reference colors, and means for directing light through the storage surface, first photosensitive means for producing an output signal corresponding with the color of light directed thereto, means for directing light from the storage areas to the first photosensitive means, a plurality of second photosensitive means for producing signals corresponding with the color of light directed thereto, means for directing light from said reference channels to respective ones of said second photosensitive means, and means for simultaneously comparing the output signal of the first photosensitive means with the output signals of each of the second photosensitive means and to indicate a difference therebetween.

References Cited by the Examiner

UNITED STATES PATENTS

| | | | |
|---|---|---|---|
| 3,060,790 | 10/1962 | Ward | 340—146.3 X |
| 3,072,889 | 1/1963 | Willcox | 340—173 |
| 3,138,783 | 6/1964 | Toulmin | 340—173 |

IRVING L. SRAGOW, *Primary Examiner.*